United States Patent [19]

Lucas et al.

[11] Patent Number: 5,779,217
[45] Date of Patent: Jul. 14, 1998

[54] DIAPHRAGM ACTUATED AIR CYCLE VALVE

[75] Inventors: Clive D. Lucas, Richmond Heights; Jeffrey C. Armour, Garfield Heights; Ahmed I. Sabet, North Royalton, all of Ohio

[73] Assignee: North American Manufacturing Company, Cleveland, Ohio

[21] Appl. No.: 614,962

[22] Filed: Mar. 11, 1996

[51] Int. Cl.⁶ .................................................. F16K 31/12
[52] U.S. Cl. ........................ 251/30.01; 251/58; 251/305
[58] Field of Search .............................. 251/30.01, 305, 251/58, 61.3, 61.4

[56] References Cited

U.S. PATENT DOCUMENTS

| | | | |
|---|---|---|---|
| 1,885,367 | 11/1932 | McKee | 251/58 |
| 2,372,273 | 3/1945 | Hermanson | 251/58 |
| 2,884,003 | 4/1959 | Jensen | 251/58 |
| 2,993,496 | 7/1961 | Ackley | 251/58 |
| 3,575,197 | 4/1971 | Ray . | |
| 3,727,880 | 4/1973 | Stock | 251/58 |
| 3,743,237 | 7/1973 | Kiser . | |
| 3,894,713 | 7/1975 | Ito et al. . | |
| 3,960,358 | 6/1976 | Vollmer et al. . | |
| 3,985,151 | 10/1976 | Smith | 251/58 |
| 4,073,465 | 2/1978 | Sheppard | 251/63.4 |
| 4,120,480 | 10/1978 | Ando et al. . | |
| 4,130,266 | 12/1978 | Bertling . | |
| 4,175,528 | 11/1979 | Mennesson . | |
| 4,198,030 | 4/1980 | Jackson et al. . | |
| 4,299,089 | 11/1981 | Takeda . | |
| 4,310,141 | 1/1982 | Tamura . | |
| 4,313,592 | 2/1982 | Baas | 251/304 |
| 4,358,927 | 11/1982 | Day et al. . | |
| 4,367,861 | 1/1983 | Bray et al. | 251/305 |
| 4,424,738 | 1/1984 | Leighton . | |
| 4,456,218 | 6/1984 | Kawabata et al. . | |
| 4,483,508 | 11/1984 | Marsh et al. . | |
| 4,553,731 | 11/1985 | Carpenter | 251/305 |
| 4,752,445 | 6/1988 | Zell . | |
| 4,969,424 | 11/1990 | Klomp . | |
| 5,117,797 | 6/1992 | Telep et al. . | |

FOREIGN PATENT DOCUMENTS

| | | |
|---|---|---|
| 760 111 | 9/1952 | Germany . |
| 12 08 960 | 1/1966 | Germany . |
| 26 08 139 | 1/1977 | Germany . |
| 27 24 529 | 12/1977 | Germany . |
| 923 091 | 4/1963 | United Kingdom . |

*Primary Examiner*—A. Michael Chambers
*Attorney, Agent, or Firm*—Jones, Day, Reavis & Pogue

[57] ABSTRACT

An actuated air valve includes a valve body in line with a flow passage for admitting a flow of fluid. A valve member is pivotally mounted about the centerline of the valve body and is pivoted between high flow and low flow positions. A diaphragm and linkage is in mechanical connection to the valve member. A pressure tap from the flow of fluid provides an impulse to the diaphragm which displaces the linkage, thus varying the position of the valve member. A three-way solenoid valve is used to selectively admit the impulse to the diaphragm, thus governing the displacement of the linkage, and thereby varying the position of the valve member.

10 Claims, 2 Drawing Sheets

DIAPHRAGM ACTUATED AIR CYCLE VALVE

BACKGROUND OF THE INVENTION

The present invention is directed to the field of valves, for example, valves used to cycle the flow of a gas. In particular, the present invention is directed to valves of the type used to rapidly cycle the flow rate of a fluid between a low and a high level.

Several types of valve controls are known for cycling fluid flow in industrial applications, particularly combustion applications. A valve type commonly used with such controls is the butterfly-type valve. A butterfly-type valve is typically a circular disc which is arranged to pivot in an appropriately-sized cylindrical fluid passageway. The valve is closed when the surface of the disc is perpendicular to the direction of flow and open when the surface of the disc is parallel to the flow. There is thus 90 degrees of pivot in the stroke of the common butterfly-type valve.

One common valve control scheme includes an electric motor that is mechanically linked to a butterfly-type valve. Actuation of this type of valve is very slow. Typically, 15–120 seconds are required to complete the valve stroke between the open and closed positions (which correspond respectively to "high fire" and "low fire" states within the burner.) Such slow actuation is not satisfactory for many heating processes, particularly those which are used with multiple burner systems in which each burner is frequently cycled between low and high fire.

Another type of valve control scheme uses an electric solenoid actuator to drive a butterfly-type valve. However, with these actuators, the response time is too fast for practical flame control. Also, such actuators are expensive and consume a great deal of electrical power. The valve stroke time of a solenoid actuator can be slowed down with a dashpot accessory, but this further adds to the component cost and also the power consumption, thereby decreasing efficiency.

Still another valve control actuator device is a pneumatic-type actuator which uses compressed air to drive a butterfly valve. These actuator types consume a great deal of power. In addition, the compressor and the many ancillary components (i.e. the dryer, piping, valves, etc.) result in a complex system which is quite expensive. In these ways, the valves and actuators of previous systems suffer from a number of drawbacks which reduce their effectiveness of operation in burner systems.

SUMMARY OF THE INVENTION

In view of the difficulties and drawbacks encountered with previous valves and actuators, it would be advantageous to provide a valve and actuator which solve the previous problems while providing more efficient operation.

Therefore, there is a need for a valve actuator which completes the valve stroke in a period which is satisfactory for a desired heating process.

There is also a need for a valve actuator which completes the valve stroke while using a reduced amount of power.

There is also a need for a valve actuator with easily adjustable control over the valve stroke.

There is also a need for a valve actuator which is not complex, requiring fewer components than previous systems.

There is also a need for a valve actuator which is inexpensive to manufacture, using less complicated components.

These needs and others are realized by the valve and actuator of the present invention which includes a valve body in line with a flow passage for admitting a flow of fluid. A valve member is retained within the valve body and is varied between open and closed positions for respectively admitting and obstructing the flow of fluid. An actuation assembly, preferably a diaphragm with linkage, is in mechanical connection with the valve member. Displacement of the actuation assembly varies the position of the valve member. A pressure impulse line is in fluid connection with the flow of fluid to provide an impulse to the actuation assembly. The impulse then displaces the actuation assembly and the valve member. A control is used for selectively admitting the impulse to the actuation assembly, thereby governing displacement of the actuation assembly in order to vary the position of the valve member.

As will be appreciated, the invention is capable of other and different embodiments, and its several details are capable of modifications in various respects, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein.

DETAILED DESCRIPTION OF THE INVENTION

Figure 1:
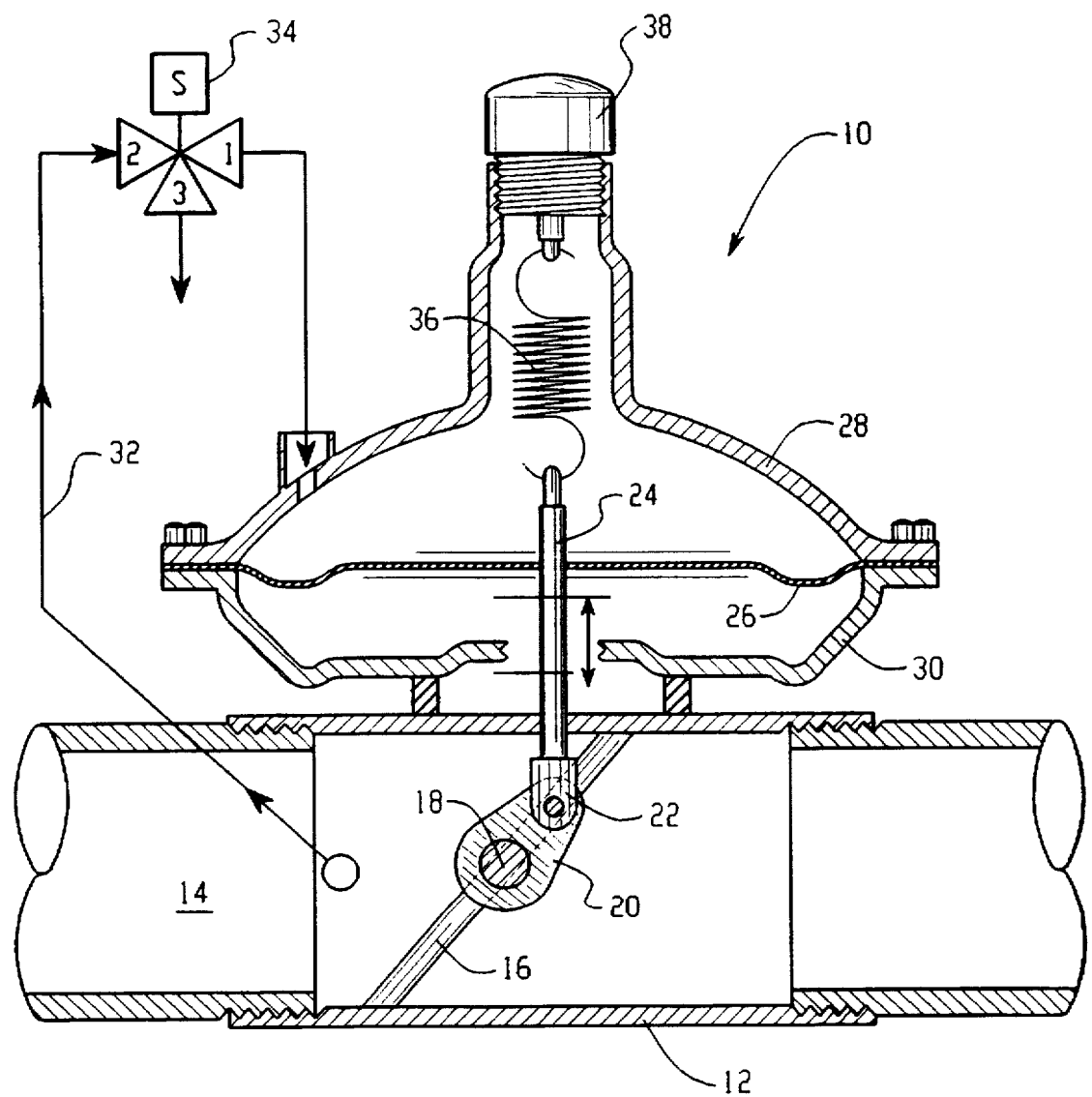
FIG. 1 is a side-sectional view of the diaphragm valve as according to a preferred embodiment of the present invention.

Referring now to the drawings which are for purposes of illustrating only the preferred embodiment of the invention and not for purposes of limiting the same. The figures show an air flow cycling valve which is actuated by a pressurized diaphragm. The present diaphragm actuated valve is especially suited for handling combustion air in a burner system.

Turning specifically to FIG. 1, the components of the diaphragm valve 10 of the present invention include a valve body 12, in line with a flow passage 14, for admitting and transmitting the flow of a fluid, preferably a gas such as combustion air. However, it will be appreciated that the present valve can be used with any fluid without departing from the invention. A valve member or disc 16 is pivotally retained within the valve body 12 and can be varied between an open position and a closed position for respectively admitting and obstructing the flow of fluid.

The valve disc 16 of the present invention is preferably an elongated valve member of the type shown in the related application to the present assignee entitled "FLOW CONTROL VALVE WITH ELONGATED VALVE MEMBER," U.S. Ser. No. 08/614,963, filed Mar. 11, 1996, invented by Jeffrey C. Armour, Clive D. Lucas and Ahmed I. Sabet, the disclosure of which is hereby incorporated by reference. The valve disc 16 is mounted on a pivotable shaft 18 which is mechanically connected to an actuation assembly that is displaced in order to vary the position of the valve disc 16. The actuation assembly includes a linkage comprised of first and second linkage elements 20, 22 which connect the valve disc 16 to a stem 24, which moves upwards and downwards in a reciprocating motion.

The stem 24 is connected to a diaphragm 26 in a fluid-tight manner (preferably with e.g. threaded fasteners and a fluid seal). The diaphragm 26 itself is retained within a diaphragm casing including respective first and second casing sections 28, 30.

A fluid-tight casing volume is enclosed by the diaphragm 26 and the first casing section 28. This casing volume is in fluid communication with a tap on the valve body 12, upstream of the valve disc 16, by means of an impulse line 32, which supplies a fluid impulse that pressurizes the casing volume. A second volume is defined by the diaphragm 26 and the second casing section 30 and this second volume is open to the atmosphere. Therefore, when the fluid-tight volume is pressurized, a pressure differential exists between the two volumes. The impulse is selectively admitted to the fluid-tight volume using a control 34, preferably a small three-way solenoid valve, (preferably Asco model no. HT8320G198V, a normally open 10.1 watt 3-way solenoid with a high-temperature coil.)

The operation of the diaphragm valve as according to the preferred embodiment will now be described. Air is supplied through the flow passage 14, typically at a static pressure of about 16 osig (ounces per square inch gauge). The present invention, unlike previous systems, uses the controlled fluid to provide the bulk of the power required to actuate the valve 16. The impulse is supplied to the fluid-tight casing volume through the impulse line 32. The solenoid valve 34 is energized to admit the impulse by connecting ports 1 and 2 (as illustrated). The first volume is pressurized by the impulse, and the diaphragm 26 is displaced toward the second volume, thereby downwardly displacing the stem 24. This displacement is transmitted to the linkage elements 20, 22 which thereby convert the displacement force into a torque upon the valve shaft 18 in order to pivot the valve disc 16 into the open position.

The stem 24 is connected to a tension spring 36 at its end opposite the linkage. The spring 36 thus supplies a restoring force to the valve disc 16 through the linkage 20, 22 and the stem 24. In this way, the speed of displacement can be varied by adjusting the tension on the spring 36, as the displacement force is the resulting difference between the spring force and the fluid force on the diaphragm. In the preferred embodiment, the spring 36 is adjusted to permit the displacement of the full stroke (about ½ inch) within a period of about two seconds. The spring tension is varied by an adjustment knob 38 which is preferably threaded, and can be backed in and out by turning the knob, so as to vary the valve spring tension as desired.

The valve 10 is closed by de-energizing the solenoid valve 34 which connects ports 1 and 3 (as illustrated) thereby venting the fluid-tight casing volume 28 to atmosphere and equalizing the pressure between the two volumes. The restoring force on the spring 36 resets the valve 10 to its original closed position. In this way, the valve 10 is always closed when de-energized.

Figure 2:
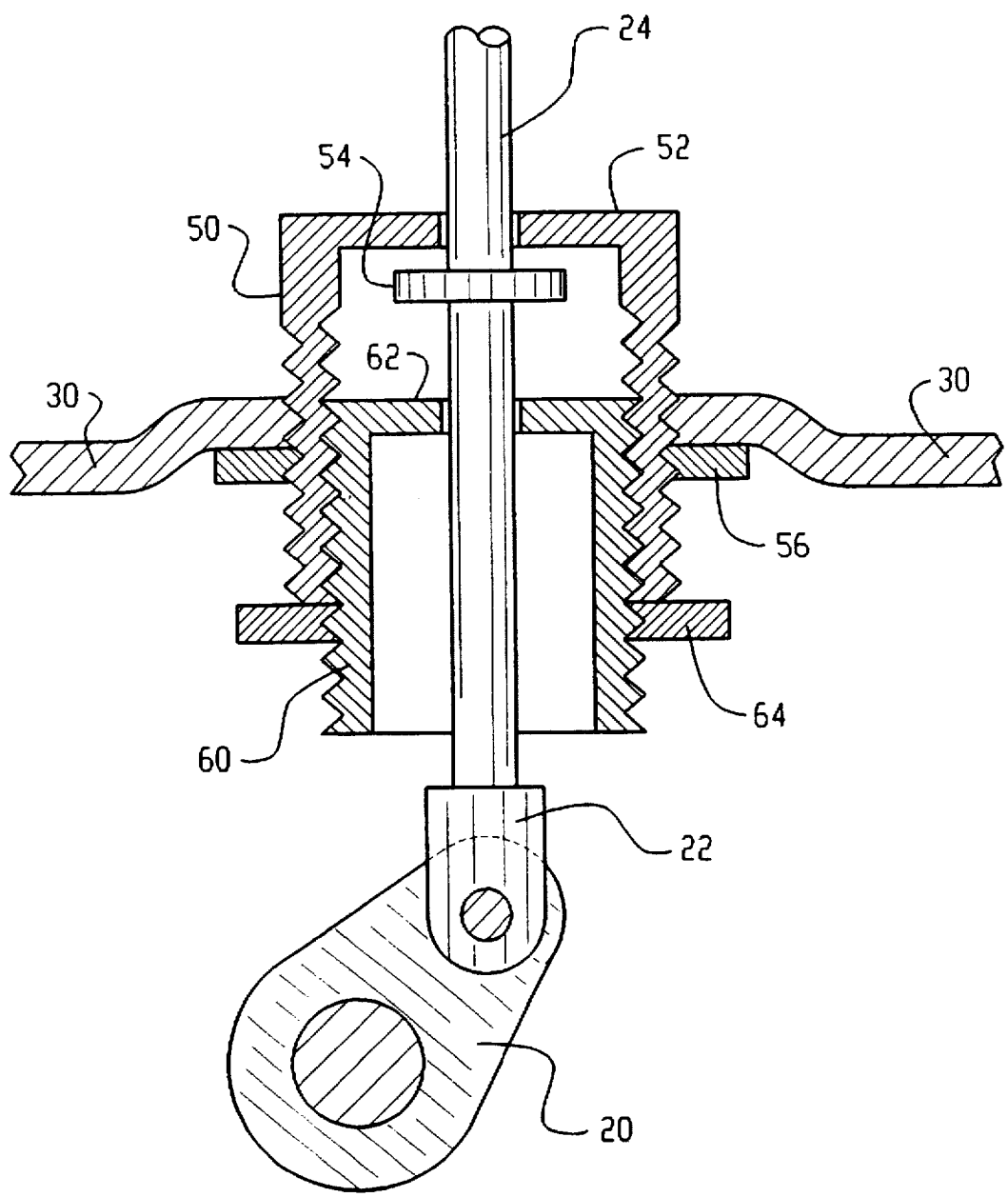
FIG. 2 is a side-sectional view showing a detail of the adjustment stops as according to the present invention.

As shown in FIG. 2, the present invention also includes a pair of adjustment stops which limit the stem displacement in order to establish adjustable valve positions for particular low and high flow conditions. A low flow adjustment stop 50 is threaded on its outer diameter and received within a threaded opening in the bottom of the second casing section 30. The low flow stop 50 has a top portion 52 with an opening that admits the stem 24 so as to not inhibit its reciprocating motion. The stem 24 is securely fitted with a washer 54. When the valve 10 is at low flow, the washer 54 stops against the top portion 52, thereby limiting the minimum displacement of the stem 24 and holding the valve open at a minimum desired low flow position. The low flow position can be adjusted by screwing the low flow stop 50 in or out of the casing 30 until the desired position is achieved. The stop 50 is held in place with a threaded lock nut 56 which secures the stop against the casing portion 30.

High flow is controlled using a high flow adjustment stop 60 which is threaded on its outer diameter to mate with the threads on the inner diameter of the low flow stop 50. The high flow stop 60 has a top portion 62 with an opening that admits the stem 24 so as to not inhibit its reciprocating motion. As with the low flow stop 50, the top portion 62 of the high flow stop 60 stops the washer 54, thereby limiting the maximum displacement of the stem 24 and holding the valve open at a maximum desired high flow position. The high flow position can be adjusted by screwing the high flow stop 60 in or out of the low flow stop 50 until the desired position is achieved. The stop 60 is also held in place with a threaded lock nut 64 which secures the stop 60 against the bottom of the low flow stop 50. The high and low flow stops 50, 60 can thus be used to adjust minimum and maximum air flows to desired levels. The threaded stops 50, 60 and the lock nuts 56, 64 are easily adjusted and tightened by hand, permitting easy adjustment by operators in the field.

The present diaphragm-actuated valve offers many advantages over prior valve configurations. Since the present valve is powered by the existing flow supply, very little additional energy is required to actuate the valve. The impulse solenoid valve 34 consumes about 34% of the power required for a solenoid-actuated cycling valve. In addition to the above, the valve actuation period is about two seconds, significantly faster than conventional electric motor actuators. Also, the valve closing time is slower than the opening time, which provides for better gas regulator tracking during turndown. The design is simple in construction, using fewer and less expensive parts, thus being easy and inexpensive to manufacture, assemble, install and maintain. Also, since there is little component friction, the valve has a life cycle in excess of 1.5 million cycles without wearing out or experiencing component failure.

Further, the settings on the valve can be varied in a number of ways; by setting the stem connection and/or the low and high flow adjustment stops 50, 60; by varying the tension on the spring 36; and by orificing the impulse solenoid 34 or the impulse taps. As a final advantage, the present valve 10 provides fail-safe operation in use with a combustion system. Since the valve 10 is always at low flow when the solenoid 34 is de-energized, the valve 10 closes during a power outage, thus reducing damage to upstream components due to backfluing of hot combustion gases. Also, the valve fails at low flow upon blower failure or loss of fluid pressure. Thus, the present valve is intrinsically safer than those of previous systems.

As described hereinabove, the present invention solves many problems associated with previous systems, and presents improved efficiency and operability. However, it will be appreciated that various changes in the details, materials and arrangements of parts which have been herein described and illustrated in order to explain the nature of the invention may be made by those skilled in the art within the principle and scope of the invention as expressed by the appended claims.

We claim:

1. A valve for adjusting the flow of a fluid, said valve comprising:

a valve body in line with a flow passage for admitting a flow of fluid;

a valve member retained within the valve body, said valve member being varied between a high flow position and a low flow position for respectively admitting and obstructing the flow of fluid;

an actuation assembly including a diaphragm member, in mechanical connection with the valve member, wherein said diaphragm member is displaced in order to vary the position of the valve member;

an impulse line in fluid communication with the flow of fluid for providing a pressurized impulse fluid to the actuation assembly, wherein the diaphragm member distends in response to the pressure of the impulse fluid in order to displace the valve member;

a control for selectively admitting the impulse fluid to the actuation assembly, thereby governing displacement of the diaphragm in order to vary the position of the valve member.

2. The valve of claim 1 wherein the diaphragm member includes a mechanical connection for transmitting the displacement to the valve member.

3. The valve of claim 2 wherein the mechanical connection to the valve member includes a stem which is connected to the diaphragm and a linkage connected to the valve member so as to transmit the displacement.

4. The valve of claim 3 wherein the stem is attached to an adjustable spring which permits control of the rate of the displacement.

5. The valve of claim 3 wherein the stem includes a washer and wherein the valve further includes an end stop comprising first and second stops, wherein the first stop is threadably received within an opening in the actuation assembly, and the second stop is threadably received within the first stop, wherein the first and second stops limit the position of the washer so that the high flow and low flow positions can be varied by respectively screwing the stops in or out to achieve a desired position.

6. The valve of claim 5 wherein the first stop is a high flow adjustment stop and the second stop is a low flow adjustment stop.

7. The valve of claim 1 wherein the actuation assembly includes an end stop for selectively limiting the displacement so as to define predetermined high flow and low flow positions of the valve member.

8. The valve of claim 1 wherein the control is a three-way solenoid valve which selectively admits and blocks the impulse to the actuation assembly, so as to vary the position of the valve member.

9. The valve of claim 1 wherein the impulse line is connected to a tap drawn from the valve body upstream of the valve member.

10. The valve of claim 1 wherein the valve member is an elongated valve member.

* * * * *